United States Patent [19]

Sato et al.

[11] 3,818,079

[45] June 18, 1974

[54] METHOD OF PREVENTING THE POLYMERIZATION OF UNSATURATED CARBOXYLIC ACID

[75] Inventors: Ryozi Sato, Takaoka; Yasuyoshi Chino, Tokyo; Tatus Endo, Yokohama, all of Japan

[73] Assignee: The Japanese Geon Company, Ltd., Tokyo, Japan

[22] Filed: July 2, 1971

[21] Appl. No.: 159,553

[30] Foreign Application Priority Data
July 7, 1970  Japan................ 45-58764

[52] U.S. Cl.............. 260/526 N, 203/8, 203/35
[51] Int. Cl.................... C07c 51/50, C07c 57/04
[58] Field of Search.......... 203/8, 9, 35, 60, 57, 65; 260/526 N

[56] References Cited
UNITED STATES PATENTS

| | | | |
|---|---|---|---|
| 2,171,795 | 9/1939 | Kautter | 203/60 |
| 2,758,072 | 8/1956 | Sutherland et al. | 203/60 |
| 2,978,501 | 4/1961 | Adams | 260/526 N |
| 3,462,484 | 8/1969 | Schnizer et al. | 203/8 |
| 3,639,466 | 2/1972 | Leichtle | 260/526 N |
| 3,658,895 | 4/1972 | Riemann et al. | 203/38 |

*Primary Examiner*—Wilbur L. Bascomb, Jr.
*Attorney, Agent, or Firm*—Sherman & Shalloway

[57] ABSTRACT

A method of preventing polymerization of an unsaturated carboxylic acid selected from the group consisting of acrylic acid and methacrylic acid, which comprises adding to the acid, as the polymerization inhibitor, the combination of (i) at least one phosphorus compound selected from the group consisting of phosphoric acid compounds and phosphorus oxide compounds, and (ii) at least one hydroxyl group containing compound selected from the group consisting of cresols, 4,4-thiobis-6-tert.-butyl-3-methylphenol, dihydroxybenzene derivatives and pyrogallol, in the amount sufficient to inhibit polymerization of the monomer.

12 Claims, No Drawings

METHOD OF PREVENTING THE POLYMERIZATION OF UNSATURATED CARBOXYLIC ACID

This invention relates to stabilization of unsaturated carboxylic acids.

Unsaturated carboxylic acids such as acrylic and methacrylic acids (which may be hereinafter referred to simply as the monomer) are valuable as starting materials in chemical industries. It is well known that they are extremely unstable compounds which are likely to give rise to the polymerization reaction with ease. It is essential, therefore, that such monomers should be sufficiently stabilized (polymerization inhibition of monomers) in carrying out production, storage and transpotation of these monomers. Light and heat are particularly effective agents to induce polymerization of such monomers. Consequently, when the monomers are exposed to high temperatures (50°C. and above, particularly 70° – 150°C., and still higher temperatures) in the course of their processing such as distillation and refining, the polymers thereof are precipitated in the system and frequently clog the distillation column, pipes, etc., seriously interfering with the operation. Thus, their strong tendency to be polymerized proves highly disadvantageous industrially and economically.

As the widely used conventional polymerization inhibitor of acrylic acid or methacrylic acid, such compounds as hydroquinone, phenol, t-butylcatechol, cresol, phenothiazine, ethylene thiourea, etc. may be named, but satisfactory results are not necessarily achieved with such known compounds. Particularly many of them fail to stabilize the monomers against high temperatures. Again, while the monomers are especially apt to be polymerized when they are in contact with stainless steel or carbon steel, no sufficiently effective polymerization inhibitor is known in such a case. Furthermore, even those polymerization inhibitors which show some stabilizing effect at high temperatures for short duration seldom exhibit effective stabilization action for prolonged periods.

Accordingly, the object of the present invention is to provide a method for preventing polymerization of acrylic or methacrylic acid, particularly at elevated temperatures, using a novel polymerization inhibitor which can exhibit a sufficient stabilization effect for acrylic or methacrylic acid which are being processed at elevated temperatures.

Other objects and advantages of the invention will become apparent from reading the following description.

As the result of research to find a novel stabilization method meeting the above objects of the invention, we discovered that the conjoint use of a specific phosphorus compound with a specific hydroxyl group-containing compound as the polymerization inhibitor exhibits outstanding effects as a stabilizer for monomers. Accordingly, this invention provides a method of preventing polymerization of an unsaturated carboxylic acid selected from the group consisting of acrylic acid and methacrylic acid, which comprises adding to such acid, as the polymerizations inhibitor, the combination of (i) at least one phosphorus compound selected from the group consisting of phosphoric acid compounds and phosphorus oxide compounds, and (ii) at least one hydroxyl group-containing compound selected from the group consisting of cresols, 4,4-thiobis-6-tert. butyl-3-methylphenol, dihydroxybenzene derivatives and pyrogallol, in the amount sufficient to inhibit polymerization of the monomer.

The precise mechanism of the stabilization action of the above phosphorus compounds (i) and hydroxyl group-containing compounds (ii) on the unsaturated carboxylic acid is not yet clear. In view of the fact, however, that in the control runs wherein (a) phosphorus compounds outside the specified phosphorus compound (i) were used with the compound (ii), (b) hydroxyl group-containing compounds outside the scope of compound (ii) were used with the compound (i), (c) the compound (i) alone was used, and (d) the compound (ii) alone was used, the stabilization effect was observed in no case, and that the conjoint use of the compounds (i) and (ii) exhibits absolutely no synegistic effect in stabilization of unsaturated carboxylic acid esters, it is presumed that a certain synergistic effect is obtained from the combination of compounds (i) and (ii) and the unsaturated carboxylic acid, as specified in the present invention.

The polymerization inhibitor in accordance with the present invention shows remarkable stabization effect over prolonged periods, not only when the monomer is kept under low temperatures as in storage, but particularly when the monomer is exposed to elevated temperatures. Furthermore, the stabilization effect is never reduced or impaired when the monomer is in contact with stainless or carbon steel. The polymerization inhibitor of the present invention is also unique in that it exhibits satisfactory stabilization effect inhibitor under such severe conditions as when the monomer alone is exposed to elevated temperatures. Obviously, the inhibitor is extremely useful when added to an esterification reaction system of the unsaturated carboxylic acid. The unsaturated carboxylic acid obtained by the recently noticed method, i.e., preparation of acrylic or methacrylic acid by oxidation of propylene, acrolein, or isobutylene, and methacrolein, contains a number of side products such as aldehyde, acetone, acetic acid, etc., besides the considerably large amount of water. However, the stabilization effect of the subject shows no substantial reduction in the presence of such impurities.

As described previously, the object of the present invention is essentially achieved by the conjoint use of the aforespecified phosphorus compound (i) and hydroxyl group-containing compound (ii) as the polymerization inhibitor for acrylic or methacrylic acid. Further research disclosed that the stabilization effect of the inhibitor for monomeric acrylic or methacrylic acid is further enhanced by the addition of the third compound (iii) selected from the group consisting of phosphorus acid esters, phosphine derivatives, and benzaldehyde, together with the foregoing compounds (i) and (ii). Furthermore, when compound (i), (ii) and (iii) are used conjointly, the polymerization of the monomer at such places where the monomer is condensed from the gaseous phase, for instance, internal wall surface at the upper part of the distillation column, periphery of the internal wall surface of cooler, or places where the monomer mist stays, can be effectively inhibited.

Now the compounds (i), (ii), and (iii) will be more specifically explained. Examples of the phosphoric acid compounds within the scope of compound (i) include: hypophosphorous acid, phosphorous acid, diphosphorous acid, iso-hypophosphoric acid, ortho-phosphoric acid, pyrophosphoric acid, metaphosphoric acid, and polyphosphoric acid. Whereas, the phosphorus oxide compounds include phosphorus dioxide, phosphorus trioxide, and phosphorus pentoxide. Examples of dihydroxybenzene derivatives as the compound (ii) include hydroquinone, catechol, resorcinol, p-t-butylcatechol, etc. Whereas, the phosphorous acid esters as the compound (iii) include, for example, alkyl phosphites containing 1 – 8 carbon atoms in the alkyl groups, such as dimethyl-, diethyl-, dibutyl-, trimethyl-, triethyl-, tributyl-, and trioctyl-phosphites; and aryl phosphites such as diphenyl-, ditolyl-, dioxylyl-, triphenyl-, tritolyl-, and trixylyl-phosphites. The useful phosphine derivatives within the compound (iii) include, for example, alkylphosphines containing 1 – 8 carbon atoms in the alkyl groups, such as dimethyl-, diethyl-, dibutyl-, dioctyl-, trimethyl-, triethyl-, and trioctyl- phosphines; and arylphosphines such as diphenyl-, ditolyl-, dixylyl-, triphenyl-, tritolyl-, and trixylyl-phosphines.

In the addition of the compounds (i) and (ii), or, compounds (i), (ii) and (iii) to the unsaturated carboxylic acid in accordance with the subject method, the order, or manner, of addition is not critical, but any suitable order or means may be employed.

The quantity of the subject polymerization inhibitor [compounds (i) + (ii), or (i) + (ii) + (iii)] to be added in accordance with the invention is variable over a wide range, depending on the environmental conditions under which the monomer is placed, such as the temperature, and type of the solvent, if the monomer is in the form of solution. Normally satisfactory stabilization can be achieved, by using 0.001 – 5 percent by weight, preferably 0.01 – 3 percent by weight, of the inhibitor based on the monomer, although the use of still greater quantity invites no notable disadvantage.

When the compounds (i) and (ii) are used as the inhibitor, the weight ratio therebetween normally ranges 1.0 : 0.1 – 1.0, preferably 1.0 : 0.3 – 0.7. Whereas, when the compounds (i), (ii), and (iii) are used, the weight ratio normally ranges 1.0 : 0.2 – 1.0 : 0.05 – 0.8, preferably 1.0 : 0.3 – 0.8 : 0.007 – 0.6.

In accordance with the invention, furthermore, the polymerization inhibitor may be used with conventional stabilizers of unsaturated monomers, to obtain a still greater stabilization effect.

The invention will be hereinafter explained in further details, with reference to non-limitative working examples.

Examples 1 – 12 and Controls 1 – 37

Refined methacrylic or acrylic acid and various polymerization inhibitors of the quantities specified in the following Tables 1 through 4 were each charged in a glass ampule together with a piece of stainless steel, and allowed to stand for 20 hours at 130°C., while the monomer was in contact with the stainless steel piece. The state of the solutions in the glass ampules was observed after 5 and 20 hours of standing, to examine if insoluble polymer was formed. The results are also given in Tables 1 through 4, in which the indication, "solidified," signifies that the entire sample system was solidified by polymerization. MAA denotes methacrylic acid, and AA denotes acrylic acid. The sample solutions of the runs within the scope of this invention, which were transparent or contained very minor amounts of precipitate after 20 hours of standing, were thrown into n-hexane, to examine the state of polymer precipitation. According to the degree of polymer precipitation the samples were graded as follows:

A: Substantially no turbidity or very slight turbidity was observed;

B: Only minor amount of polymer precipitation was observed.

TABLE 1 (Examples 1–12)

| Ex. No. | Type and Quantity of Inhibitor (wt. % to monomer) | Monomer | State of Solution After 5 Hrs. | State of Solution After 20 Hrs. | State of Polymer Precipitation in n-Hexane |
|---|---|---|---|---|---|
| 1 | Ortho-phosphoric acid (1.0) + p-cresol (0.5) | MAA | Colorless and transparent | Very light yellow but transparent | A |
| 2 | Ortho-phosphoric acid (1.0) + p-cresol (1.) | do | do | do | A |
| 3 | Ortho-phosphoric acid (1.0) + 4,4-thiobis-6-t-butyl-3-methylphenol (0.5) | do | do | do | A |
| 4 | Ortho-phosphoric acid (1.0) + p-t-butylcatechol (0.5) | do | do | do | A |
| 5 | Ortho-phosphoric acid (1.0) + hydroquinone (1.0) | do | do | do | A |
| 6 | Ortho-phosphoric acid (1.0) + catechol (1.0) | do | do | do | A |
| 7 | Ortho-phosphoric acid (1.0) + resorcinol (1.0) | do | do | do | A |
| 8 | Ortho-phosphoric acid (1.0) + pyrogallol (1.0) | do | do | do | A |
| 9 | Polyphosphoric acid [approx. $H_6P_4O_{13}$] (1.0) + p-cresol (0.5) | do | do | Very minor amount of precipitate was formed. | B |
| 10 | Phosphorous acid (1.0) + p-cresol (0.5) | do | do | Deep yellow and transparent | A |
| 11 | Phosphorus pentoxide (1.0) + p-cresol (0.5) | do | do | Very minor amount of precipitate was formed. | B |
| 12 | Ortho-phosphoric acid (1.0) + p-cresol (1.0) | AA | do | Deep yellow and transparent | A |

Table 2 (Controls 1 – 5)

| Control No. | Type and Quantity of Inhibitor (wt. % to monomer) | Monomer | State of Solution After 5 Hrs. | State of Solution After 20 Hrs. |
|---|---|---|---|---|
| 1 | None | MAA | Solidified within 10 minutes | Solidified |
| 2 | Sodium tripolyphosphate (1.0) + hydroquinone (0.5) | do. | Precipitate was formed after approx 15 minutes. | do. |
| 3 | Sodium tripolyphosphate (1.0) + hydroquinone (1.0) | do. | Precipitate was formed after approx. 30 minutes. | do. |
| 4 | Sodium tripolyphosphate (1.0) + p-cresol (0.5) | do. | Precipitate was formed after approx. 15 minutes. | do. |
| 5 | Sodium metaphosphate (1.0) + p-cresol (0.5) | do. | do. | do. |

Table 3 (Controls 6 – 27)

| Control No. | Type and Quantity of Inhibitor (wt. % to monomer) | Monomer | State of Solution After 5 Hrs. | State of Solution After 20 Hrs. |
|---|---|---|---|---|
| 6 | Ortho-phosphoric acid (1.5) | MAA | Solidified | Solidified |
| 7 | Polyphosphoric acid (1.5) | do. | do. | do. |
| 8 | Phosphorous acid (1.5) | do. | do. | do. |
| 9 | Phosphorus pentcyide (1.5) | do. | do. | do. |
| 10 | p-Cresol (1.5) | MAA | Solidified | Solidified |
| 11 | p-Cresol (1.5) | AA | do. | do. |
| 12 | 4.4-Thiobis-6-t-butyl-3-methylphenol (1.5) | MAA | Large amount of precipitate was formed. | do. |
| 13 | p-t-Butylcatechol (1.5) | do. | Precipitate was formed | Almost solidified |
| 14 | Hydroquinone (2.0) | do. | do. | Solidified |
| 15 | Phenol (1.5) | do. | Solidified | do. |
| 16 | Benzylalchol (1.5) | do. | do. | do. |
| 17 | Methanol (1.5) | do. | do. | do. |
| 18 | Methylene chlorhydrin (1.5) | do. | do. | do. |
| 19 | 2,2-Bis(4'-hydroxyphenyl)propane (1.5) | do. | do. | do. |
| 20 | p-Benzoquinone (1.5) | do. | do. | do. |
| 21 | Catechol (1.5) | do. | Large amount of precipitate was formed | do. |
| 22 | Pyrogallol (1.5) | do. | do. | do. |
| 23 | α-Pyridylazo-β-naphthol (1.5) | do. | Solidified | do. |
| 24 | Methylene Blue (1.5) | do. | do. | do. |
| 25 | Ethylene thiourea (1.5) | do. | Precipitate was formed. | do. |
| 26 | Diethyl hydroxylamine (1.5) | do. | do. | do. |
| 27 | Phenothiazine (1.5) | do. | do. | do. |

Table 4 (Controls 28 – 37)

| Control No. | Type and Quantity of Inhibitor (wt. % to monomer) | Monomer | State of Solution After 5 Hrs. | State of Solution After 20 Hrs. |
|---|---|---|---|---|
| 28 | Ortho-phosphoric acid (1.0) + 2,2-bis(4'-hydroxyphenyl)propane(0.5) | MAA | Precipitate was formed after 2 hrs. | Solidified |
| 29 | Ortho-phosphoric acid(1.0) + 2,6-di-t-butyl-p-cresol(0.5) | do. | do. | do. |
| 30 | do. | AA | do. | do. |
| 31 | Phosphorous acid (1.0) + 2,6-di-t-butyl-p-cresol (0.5) | MAA | do. | do. |
| 32 | Polyphosphoric acid [approx. $H_6P_4O_{13}$] (1.0) + 2,6-di-t-butyl-p-cresol (0.5) | do. | do. | do. |
| 33 | Phosphorus pentoxide (1.0) + 2,6-di-t-butyl-p-cresol (0.5) | do. | do. | do. |
| 34 | Ortho-phosphoric acid (1.0) + methanol (0.5) | do. | Solidified | do. |
| 35 | Ortho-phosphoric acid (1.0) + ethylenechlorihydrin (0.5) | do. | do. | do. |
| 36 | Ortho-phosphoric acid (1.0) + o,o'-bisphenol (0.5) | do. | do. | do. |
| 37 | Ortho-phosphoric acid (1.0) + Methylene Blue (0.5) | do. | Large amount of precipitate was formed | do. |

As clearly demonstrated by the results shown in the above four tables, the addition of the compounds (i) and (ii) specified in the present invention to the unsaturated carboxylic acid effectively prevents polymerization of the monomer under elevated temperatures over a prolonged period. In contrast thereto, when the compound (i) is replaced by polyphosphate such as sodium tripolyphosphate and sodium metaphosphate, which are phosphorus compounds outside the scope of compound (i), no such stabilization effect is attained (refer to Controls 1 – 5). Again when either of compound (i) or (ii) is used alone, or a hydroxyl group-containing compound outside the scope of compound (ii) (inclusive of conventionally employed stabilizers) is used alone (Controls 6 – 27), or the hydroxyl group-containing compound outside the scope of compound (ii) is used concurrently with the compound (i) (Controls 28 – 37), substantially no stabilization of the monomer at elevated temperatures can be achieved.

Furthermore, the attempt to prevent polymerization of the ethyl ester of acrylic or methacrylic acid using the inhibitor of the present invention under the same test conditions as above failed to attain the synergistic stabilization effect achieved by the concurrent use of compounds (i) and (ii).

EXAMPLES 13 – 27 AND CONTROLS – 57

The compounds specified in Tables 5 – 6 below of each specified amount were added to refined methacrylic or acrylic acid. In each run the system was placed in an autoclave in such a manner that the volume of liquid portion (liquid phase portion of the monomer) substantially equalled that of the space portion (gaseous phase portion of the monomer) and that both portions were in contact with stainless steel. The system was allowed to stand for 10 hours, while the liquid phase portion was maintained at 130°C., and the vapor phase portion was externally cooled to 20° – 30°C., under reflux. The state of the solution (liquid phase portion) was observed after 5 and 10 hours of standing, to examine if insoluble polymer was formed. The results are also shown in Tables 5 – 6, in which the indication, "solidified," means that the entire sample was solidified by polymerization. MAA and AA are respectively the abbreviation of methacrylic acid and acrylic acid. The samples from the Examples of this invention which were transparent after 10 hours standing were thrown into n-hexane to examine if polymer would be precipitated. The samples were evaluated for the state of polymer precipitation as below:

A: Substantially no turbidity or very slight turbidity was observed.

B: A large amount of polymer was precipitated.

Table 5 (Examples 13–27)

| Ex. No. | Monomer | (Inhibitor (wt. % to monomer) Compound (i) | Compound (ii) | Compound (iii) | State of Solution After 5 Hrs. | State of Solution After 10 Hrs. | State of Polymer Precipitation in n-Hexane |
|---|---|---|---|---|---|---|---|
| 13 | MAA | Orthophosphoric acid (0.6) | p-cresol (0.2) | Diphenyl phosphite (0.1) | Colorless and transparent | Colorless and transparent | A |

Table 5 (Examples 13–27)

| Ex. No. | Mono-mer | (Inhibitor (wt.% to monomer)) Compound (i) | Compound (ii) | Compound (iii) | State of Solution After 5 Hrs. | After 10 Hrs. | State of Polymer Precipitation in n-Hexane |
|---|---|---|---|---|---|---|---|
| 14 | do. | do. | do. | Triphenyl phosphite (0.1) | do. | do. | do. |
| 15 | do. | do. | do. | Triethyl phosphite (0.1) | do. | do. | do. |
| 16 | do. | do. | do. | Trimethyl phosphite (0.1) | do. | do. | do. |
| 17 | do. | do. | do. | Triphenyl phosphine (0.1) | do. | do. | do. |
| 18 | do. | do. | do. | Triethyl phosphine (0.1) | do. | do. | do. |
| 19 | do. | do. | do. | Benzaldehyde (0.1) | do. | do. | do. |
| 20 | do. | Phosphorous acid (0.6) | do. | do. | do. | do. | do. |
| 21 | do. | do. | do. | Triphenyl phosphite (0.1) | do. | do. | do. |
| 22 | do. | Orthophosphoric acid (0.6) | Catechol (0.2) | do. | do. | do. | do. |
| 23 | do. | Polyphosphoric acid (0.6) | p-Cresol (0.2) | do. | do. | do. | do. |
| 24 | MAA | Orthophosphoric acid (0.6) | Pyrogallol (0.2) | Triphenyl phosphite (0.1) | Colorless and transparent | Colorless and transparent | A |
| 25 | do. | Phosphorous acid (0.6) | p-t-butyl catechol (0.2) | Triphenyl phosphine (0.1) | do. | do. | do. |
| 26 | AA | Orthophosphoric acid (0.6) | p-cresol (0.2) | Triphenyl phosphite (0.1) | do. | do. | do. |
| 27 | do. | Phosphorous acid (0.6) | do. | do. | do. | do. | do. |

Table 6 (Controls 38 – 57)

| Control No. | Monomer | Inhibitor (wt.% to monomer) Compound (i) | Compound (ii) | Compound (iii) | Other Compound | State of Solution After 5 Hrs. | After 10 Hrs. | State of Polymer Precipitation in n-Hexane |
|---|---|---|---|---|---|---|---|---|
| 38 | MAA | Orthophosphoric acid (1.0) | — | — | — | Solidified | — | — |
| 39 | do. | Phosphorous acid (1.0) | — | — | — | do. | — | — |
| 40 | do. | — | p-Cresol (1.0) | — | — | do. | — | — |
| 41 | do. | — | Hydroquinone (1.0) | — | — | do. | — | — |

Table 6 (Controls 38-57)—Continued

| Control No. | Monomer | Inhibitor (wt. % monomer) | | | Other Compound | State of Solution After 5 Hrs. | State of Solution After 10 Hrs. | State of Polymer Precipitation in n-Hexane |
|---|---|---|---|---|---|---|---|---|
| | | Compound (i) | Compound (ii) | Compound (iii) | | | | |
| 42 | MAA | — | t-Butyl catechol (1.0) | — | — | Solidified | — | — |
| 43 | do. | — | Pyrogallol (1.0) | — | — | do. | — | — |
| 44 | do. | — | — | Diphenyl phosphite (1.0) | — | do. | — | — |
| 45 | do. | — | — | Triphenyl phosphite (1.0) | — | do. | — | — |
| 46 | do. | — | — | Triethyl phosphite (1.0) | — | do. | — | — |
| 47 | do. | — | — | Triphenyl phosphine (1.0) | — | do. | — | — |
| 48 | do. | — | — | Triethyl phosphine (1.0) | — | do. | — | — |
| 49 | do. | — | — | Benzaldehyde (1.0) | — | do. | — | — |
| 50 | do. | — | Hydroquinone (0.6) | Triphenyl phosphine (0.4) | — | do. | — | — |
| 51 | do. | — | p-Cresol (0.6) | Triphenyl phosphite (0.4) | — | do. | — | — |
| 52 | do. | Orthophosphoric acid (0.6) | — | Triphenyl phosphite (0.4) | — | do. | — | — |
| 53 | do. | do. | — | Triphenyl phosphine (0.4) | — | do. | — | — |
| 54 | do. | — | Hydroquinone (0.6) | — | Chromium acetate (0.4) | do. | — | — |
| 55 | MAA | Orthophosphoric acid (0.6) | — | Triphenyl phosphite (0.2) + benzaldehyde (0.2) | — | Solidified | — | — |
| 56 | AA | — | Hydroquinone (0.6) | Triphenyl phosphite (0.4) | — | do. | — | — |
| 57 | do. | — | p-Cresol (0.6) | Benzaldehyde (0.4) | — | do. | — | — |

As clearly demonstrated by the results shown in the above Tables 5 and 6, the addition of the compounds (i), (ii) and (iii) specified in the present invention to the unsaturated carboxylic acid effectively prevented the polymerization of the monomer under elevated temperatures over a prolonged period. No polymer was observed when the surface of the interval wall of the gaseous phase portion was examined in Examples 13 – 27, whereas polymer formation was observed in Controls 38 – 57.

We claim:

1. A method of preventing polymerization of an unsaturated carboxylic acid monomer selected from the group consisting of acrylic acid and methacrylic acid, which comprises adding to said acid as the polymerization inhibitor, the combination of (i) at least one phosphorus compound selected from the group consisting of phosphoric acid compounds and phosphorus oxide compounds, and (ii) at least one hydroxyl group-containing compound selected from the group consisting of cresols, 4,4-thiobis-6-tert. butyl-3-methylphenol, hydroquinone, catechol, resorcinol, p-t-butylcatechol, and pyrogallol, said polymerization inhibitor being used in the amount of 0.001 – 5 percent by weight based on the weight of said unsaturated carboxylic acid.

2. A method of preventing polymerization of an unsaturated carboxylic acid monomer selected from the group consisting of acrylic acid and methacrylic acid, which comprises adding to said acid, as the polymerization inhibitor, the combination of (i) at least one phosphorus compound selected from the group consisting of phosphoric acid compounds and phsphorus oxide compounds, (ii) at least one hydroxyl group-containing compound selected from the group consisting of cresols, 4,4-thiobis-6-tert. butyl-3-methylphenol, hydroquinone, catechol resorcinol, p-t-butylcatechol and pyrogallol, and (iii) at least one compound selected from the group consisting of phosphorous acid esters, alkyl phosphines, the alkyl groups of which contain 1 – 8 carbon atoms, aryl phosphines and benzaldehyde, said polymerization inhibitor being used in the amount of 0.001 – 5 percent by weight based on the weight of said unsaturated carboxylic acid.

3. The method of claim 1, wherein said unsaturated carboxylic acid is exposed to elevated temperatures.

4. The method of claim 2, wherein said phosphorous acid esters are alkyl esters, the alkyl groups of which contain 1 – 8 carbon atoms.

5. The method of claim 2, wherein said unsaturated carboxylic acid is exposed to elevated temperatures.

6. The method of claim 2, wherein said phosphorous acid esters are aryl esters.

7. The method of claim 1 wherein said phosphoric acid compound is selected from the group consisting of hypophosphorous acid, diphosphorous acid, isohypophosphoric acid, ortho-phosphoric acid, pyrophosphoric acid, metaphosphoric acid and polyphosphoric acid.

8. The method of claim 1 wherein said phosphorus oxide compound is selected from phosphorus dioxide, phosphorus trioxide and phosphorus pentoxide.

9. The method of claim 1 wherein the weight ratio of (i) to (ii) ranges from 1.0:0.1 – 1.0.

10. The method of claim 9 wherein the weight ratio of (i) to (ii) is 1.0:0.3 – 0.7.

11. The method of claim 2 wherein the weight ratio of (i) to (ii) to (iii) ranges from 1.0:0.2 – 1.0:0.05 – 0.8.

12. The method of claim 11 wherein the weight ratio of (i) to (ii) to (iii) ranges from 1.0:0.3 – 0.8:0.007 – 0.6.

* * * * *